(12) United States Patent
Hudgens et al.

(10) Patent No.: US 10,863,251 B2
(45) Date of Patent: *Dec. 8, 2020

(54) STACKABLE WALL MOUNT ENCLOSURE

(71) Applicant: Leviton Manufacturing Co., Inc., Melville, NY (US)

(72) Inventors: Bryan Hudgens, Melville, NY (US); Tony Yuen, Melville, NY (US); Sean McCloud, Melville, NY (US); Elizabeth G. Rasmussen, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/543,318

(22) Filed: Aug. 16, 2019

(65) Prior Publication Data

US 2020/0077163 A1 Mar. 5, 2020

Related U.S. Application Data

(63) Continuation of application No. 16/120,998, filed on Sep. 4, 2018, now Pat. No. 10,433,031.

(51) Int. Cl.
*H04Q 1/02* (2006.01)
*H02G 3/10* (2006.01)
*H04Q 1/06* (2006.01)
*H02G 3/08* (2006.01)

(52) U.S. Cl.
CPC ............ *H04Q 1/026* (2013.01); *H02G 3/083* (2013.01); *H02G 3/10* (2013.01); *H04Q 1/066* (2013.01); *H04Q 1/13* (2013.01)

(58) Field of Classification Search
CPC .......... H04Q 1/026; H04Q 1/066; H04Q 1/13; H02G 3/083; H02G 3/10
See application file for complete search history.

(56) References Cited

U.S. PATENT DOCUMENTS

| | | |
|---|---|---|
| 5,363,440 A | 11/1994 | Daoud |
| 6,118,868 A | 9/2000 | Daoud |
| 6,157,715 A | 12/2000 | Daoud |
| 6,385,381 B1 | 5/2002 | Janus et al. |
| 7,493,003 B2 | 2/2009 | Kowalczyk et al. |
| 7,715,679 B2 | 5/2010 | Kowalczyk et al. |
| 10,433,031 B1 * | 10/2019 | Hudgens ............... H04Q 1/066 |
| 2015/0346450 A1 * | 12/2015 | Barnes, Jr. ............ G02B 6/445 385/135 |

* cited by examiner

*Primary Examiner* — James Wu
*Assistant Examiner* — Hung Q Dang
(74) *Attorney, Agent, or Firm* — Davis Wright Tremaine LLP; George C. Rondeau, Jr.; Heather M. Colburn

(57) ABSTRACT

A telecommunications enclosure having a door hingedly attached to a chassis. The chassis has a first through-hole configured to have at least one patching panel installed therein. A different enclosure, like the telecommunications enclosure, is mountable on the door. The door is rotatable relative to the chassis between closed and open positions when the different enclosure is mounted thereto. The door allows access to an interior of the chassis when the door is in the open position. The chassis and/or the door may have a second through-hole configured to allow a telecommunications cable connected to the at least one patching panel to pass therethrough and exit the interior of the chassis.

31 Claims, 14 Drawing Sheets

STACKABLE WALL MOUNT ENCLOSURE

CROSS REFERENCE TO RELATED APPLICATION(S)

The present application is a continuation of U.S. patent application Ser. No. 16/120,998, filed Sep. 4, 2018, and titled STACKABLE WALL MOUNT ENCLOSURE.

BACKGROUND OF THE INVENTION

Field of the Invention

The present invention is directed generally to wall mount enclosures used for telecommunications connectivity applications.

Description of the Related Art

Because telecommunications networks, including fiber optic and/or electrical connectors and cables, are often employed in a wide range of connectivity applications, it is necessary to provide telecommunications enclosures specific to the requirements of a given application. One such application is a demarcation point between two different telecommunications networks. In other words, a telecommunications enclosure, used to achieve fiber optic and/or electrical connectivity, may mark a boundary between two different telecommunications networks. For example, the telecommunications enclosure may be positioned between a public network operated by a telecommunications service provider and a private or local network operated by a customer of the service provider. At the demarcation point, the service provider terminates incoming telecommunications cables by connecting incoming transmission media, such as connectorized optical fibers or copper wires, to mating connectors.

A demarcation point may be housed inside a wall mounted enclosure that may be located in a telecommunications room (e.g., along with additional information technology ("IT") infrastructure equipment). As space is often limited, it is beneficial to use a wall mounted enclosure capable of housing a sufficient number of telecommunications cables (e.g., providing sufficient connectivity density) while at the same time occupying a minimum amount of wall space.

An amount of wall space occupied by a pair of wall mount enclosures can be reduced by attaching a first one of the enclosures to the wall and attaching the other second enclosure to the first enclosure. Such an arrangement is referred to as "stacking." While some stackable wall mount enclosures currently exist, stacking them can be both complex and cumbersome. For example, some prior art stackable wall mount enclosures require partial disassembly of both the first and second stacked enclosures. This disassembly typically includes removing a door of the first enclosure and a back plate of the second enclosure to pass cable(s) internally between the first and second enclosures. Then, the first and second stacked enclosures must be reassembled after the cable(s) have been passed therethrough.

Therefore, a need exists for new wall mount telecommunications enclosures. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
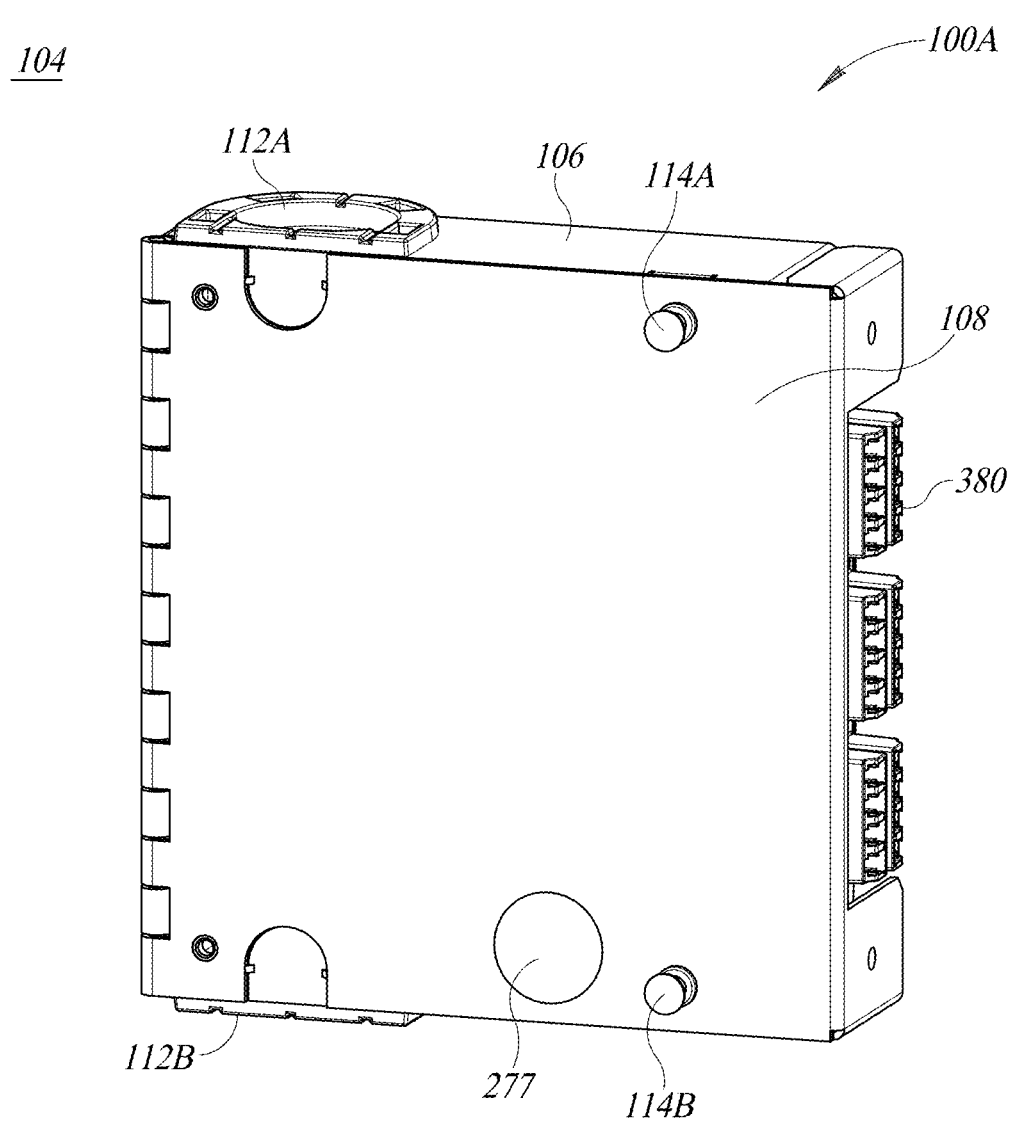
FIG. 1 is a perspective view of a first telecommunications enclosure configured to be mounted to another structure.
Figure 2A:
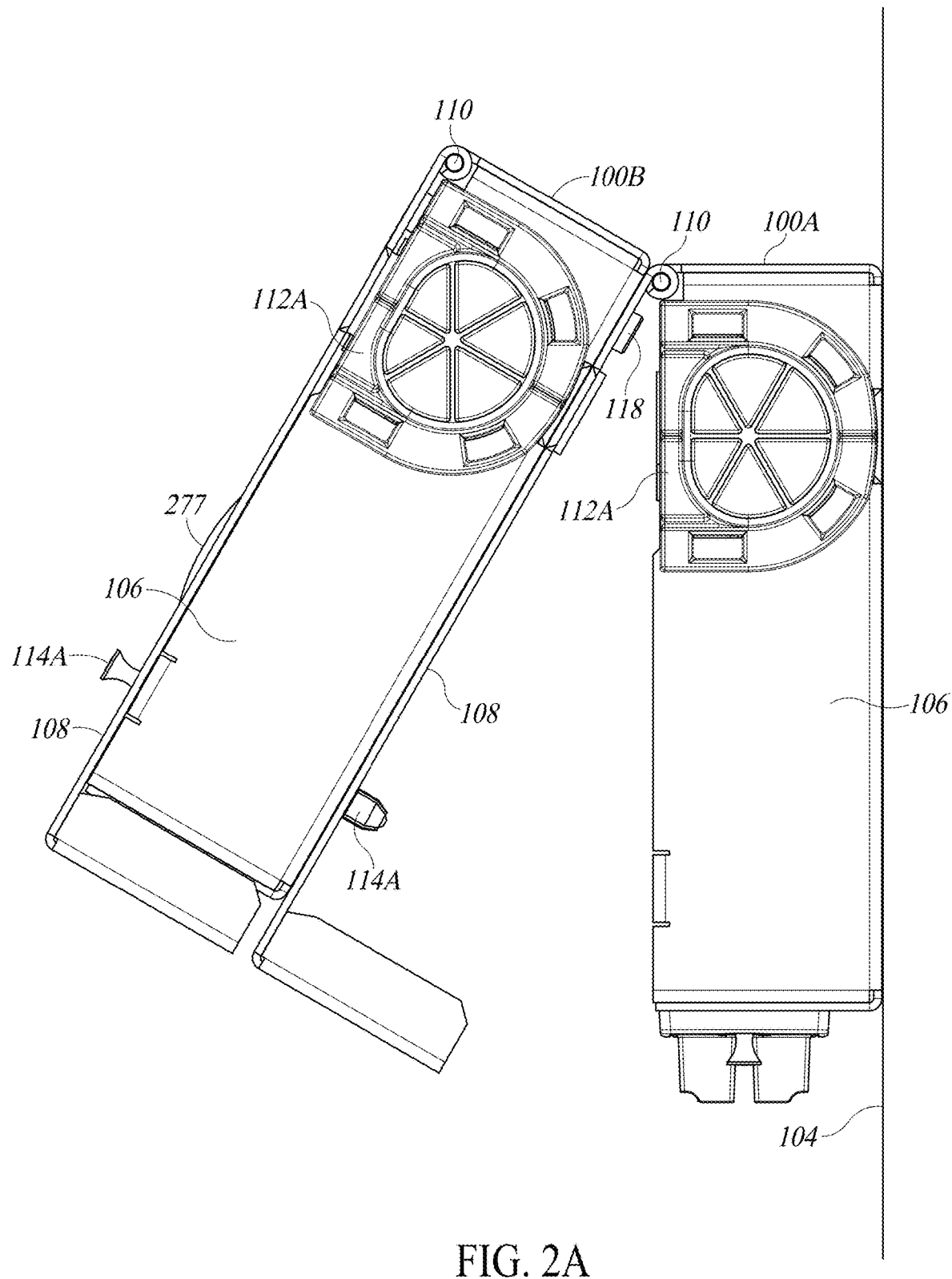
FIG. 2A is a top view of the first telecommunications enclosure of FIG. 1 illustrated with its side door in an open position and a second like telecommunications enclosure mounted on the side door of the first telecommunications enclosure.

FIG. 1 illustrates a first telecommunications enclosure 100A configured to be mounted to another structure. For example, the first enclosure 100A may be mounted on a wall 104, on a DIN rail, in a rack, in a cabinet, in a ladder rack, at a workstation, in a cubicle, within an enclosure (e.g., using an adhesive-based tape or one or more magnets), and the like. In the illustrated embodiment, the first enclosure 100A is mounted on the wall 104 (e.g., by one or more fasteners, such as screws, not shown). For example, a piece of plywood (not shown) may be installed on the wall 104 and four wood screws inserted through key slots in a chassis 106. Referring to FIG. 2A, a second enclosure 100B, like the first enclosure 100A, may be stacked on the first enclosure 100A.

Figure 2B:
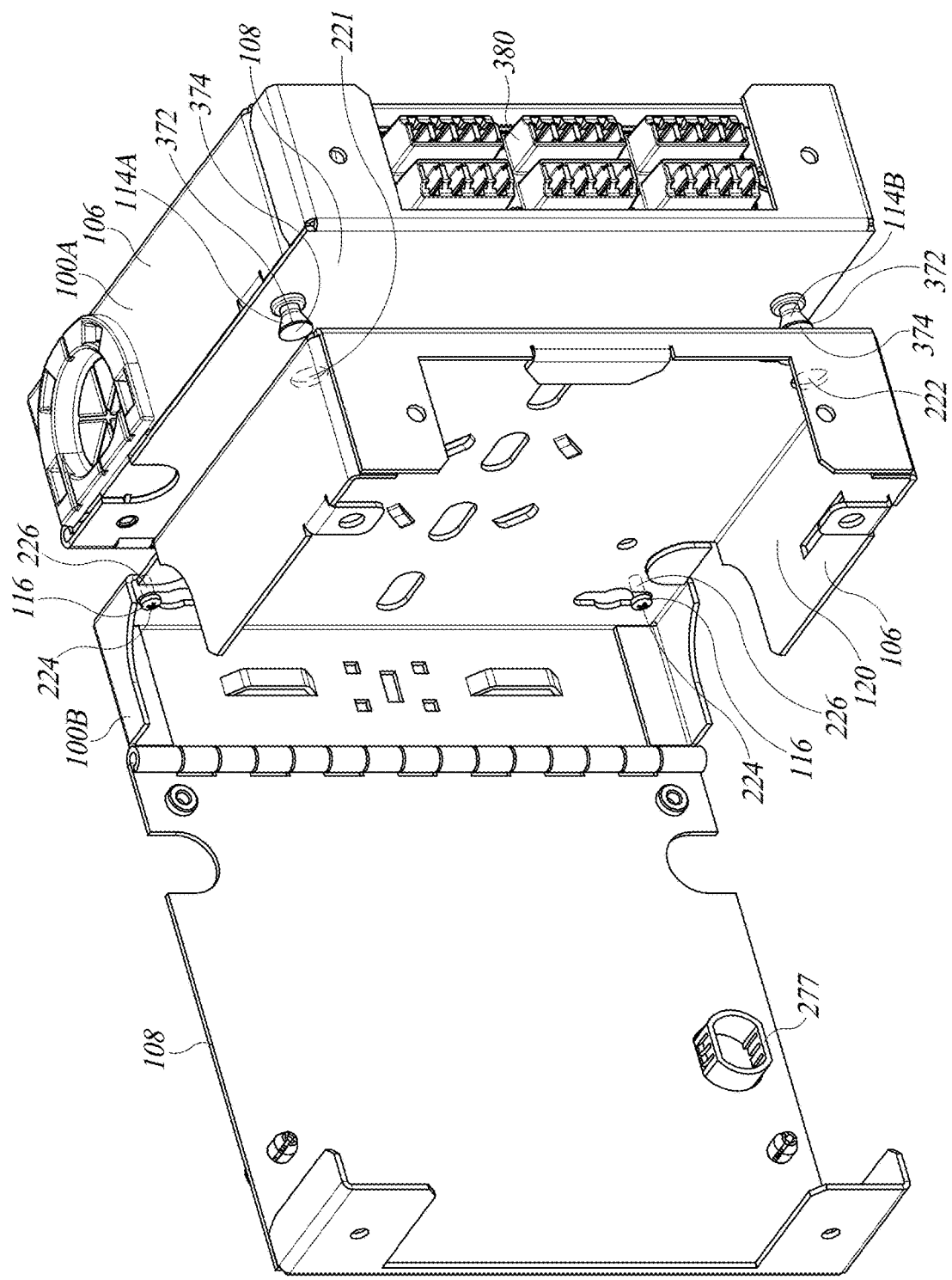
FIG. 2B is a perspective view of the first telecommunications enclosure of FIG. 1 illustrated with its side door in a closed position and the second telecommunications enclosure being mounted on the side door of the first telecommunications enclosure.

Referring to FIGS. 2A and 2B, the first enclosure 100A includes the chassis 106, a side door 108, a pin 110, one or more grommets 112A and 112B (see FIGS. 1, 3, 4, 9, 11, and 13), and one or more fastener assemblies 114A and 114B configured to releasably lock the side door 108 of the first enclosure 100A. The chassis 106 of the second enclosure 100B may be stacked on, and fastened to, the side door 108 of the first enclosure 100A, by one or more fasteners 116 including, for example, bolts threaded into nuts 118. As will be explained in detail below, this arrangement substantially reduces an amount of work required of an end user when passing cable(s) internally between the first and second enclosures 100A and 100B.

Chassis

Figure 3:
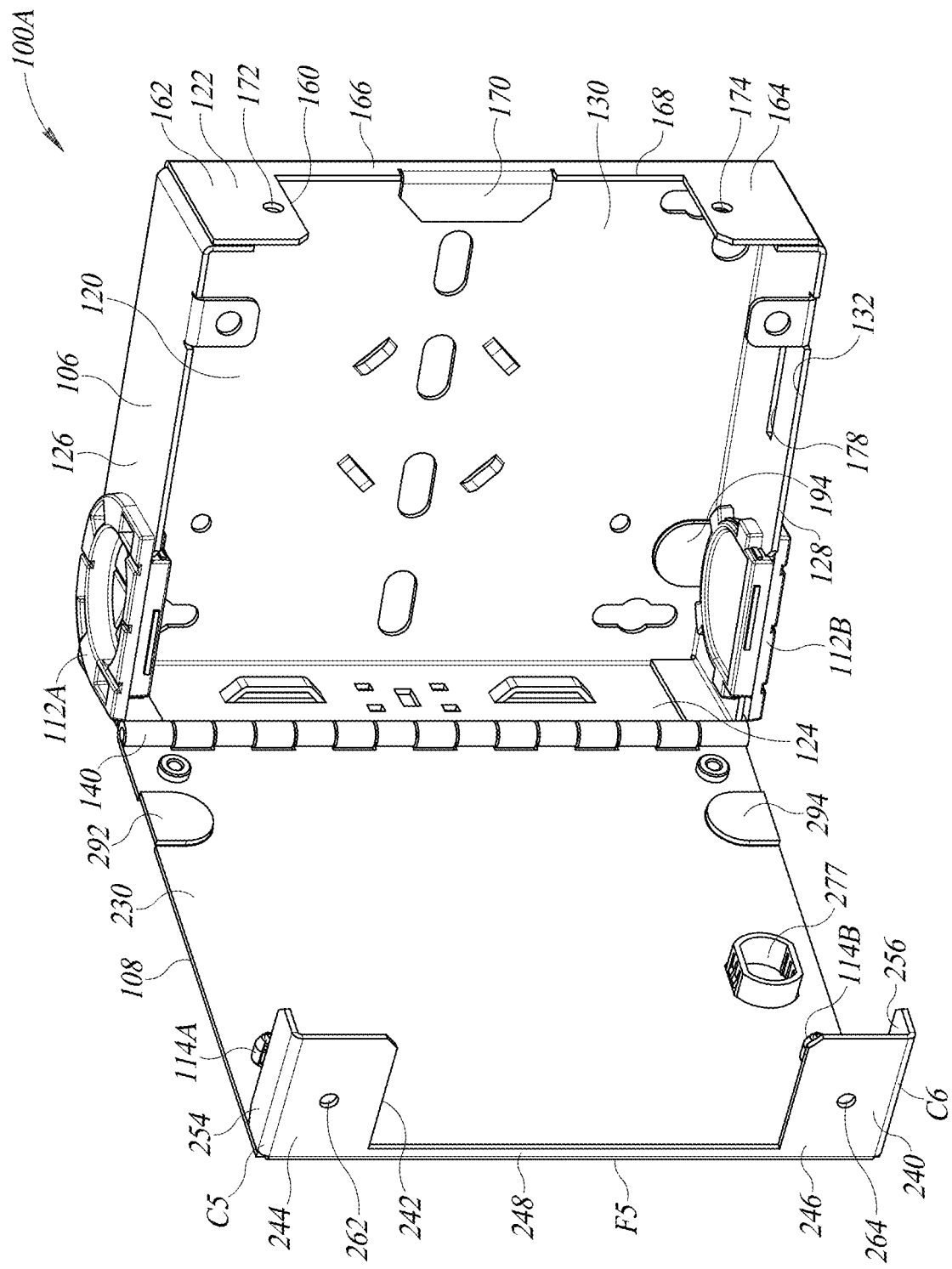
FIG. 3 is a perspective view of the first telecommunications enclosure of FIG. 1 with its side door in the open position.

Referring to FIG. 3, the chassis 106 has a hollow interior 120 defined by a front panel 122 opposite a back panel 124, a top panel 126 opposite a bottom panel 128, and a first side panel 130 opposite the side door 108. An opening 132 into the interior 120 is adjacent to and blocked by the side door 108 when the side door 108 is in a closed position (see FIGS. 1, 2B, 10, 12, and 13). However, the interior 120 is accessible through the opening 132 when the side door 108 is in an open position (see FIGS. 2A and 3).

Figure 4:
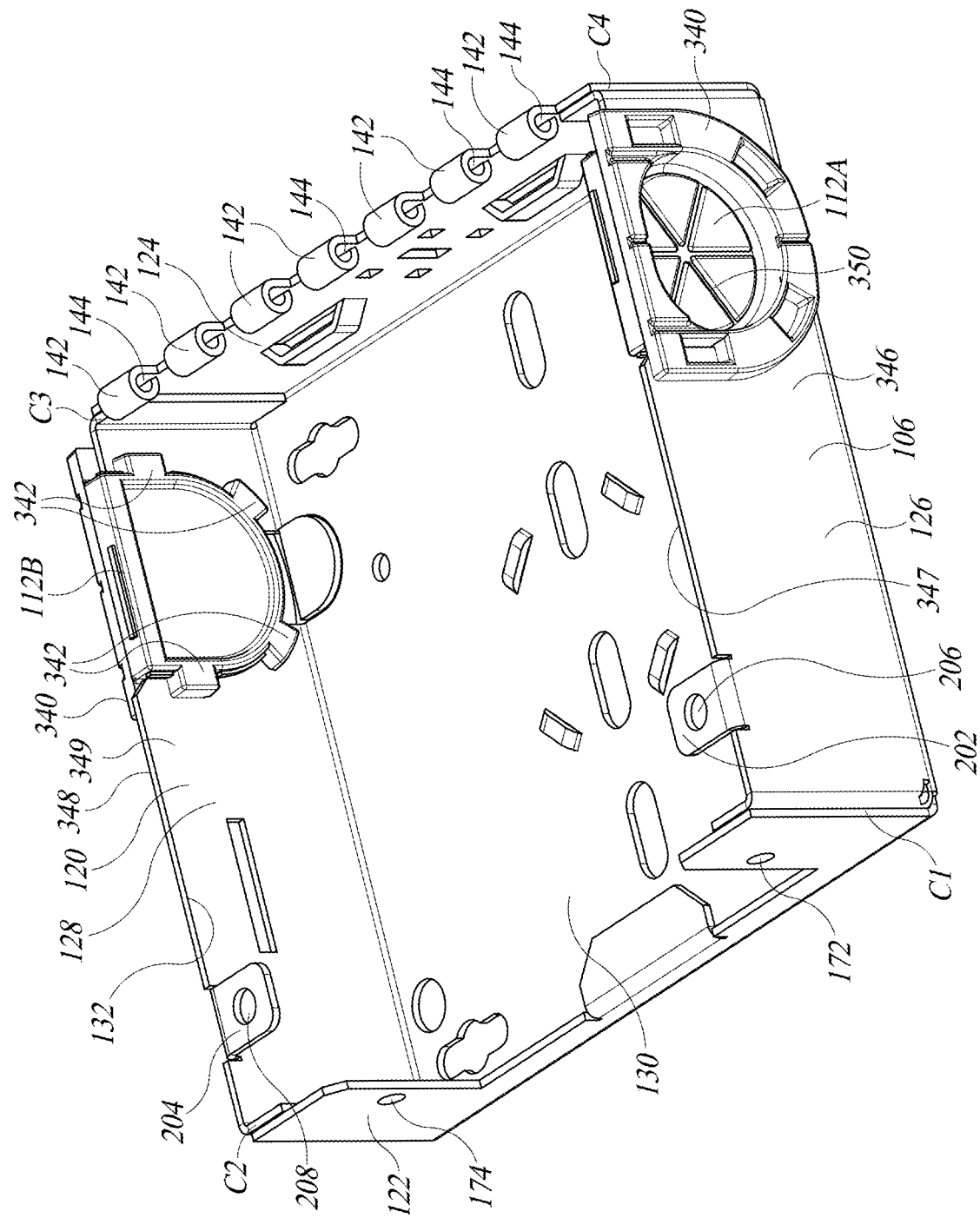
FIG. 4 is a perspective view of the first telecommunications enclosure of FIG. 1 omitting its side door and pin.

The chassis 106 may have a generally square or rectangular outer shape. Thus, the front panel 122 may be substantially parallel with the back panel 124 and the top panel 126 may be substantially parallel with the bottom panel 128. Additionally, the front and back panels 122 and 124 may be substantially orthogonal with the top and bottom panels 126 and 128. Referring to FIG. 4, the chassis 106 may include four corners C1-C4. The corner C1 is at the intersection of the front panel 122 and the top panel 126, the corner C2 is at the intersection of the front panel 122 and the bottom panel 128, the corner C3 is at the intersection of the back panel 124 and the bottom panel 128, and the corner C4 is at the intersection of the back panel 124 and the top panel 126.

Referring to FIG. 3, a piano or continuous hinge 140 connects the side door 108 to the chassis 106. The back panel 124 forms a first leaf of the hinge 140 and the side door 108 forms a second leaf of the hinge 140. Referring to FIG. 4, along the opening 132, the back panel 124 includes a first series of hinge knuckles 142 each having a through-channel 144. The through-channels 144 are aligned with one another and configured to receive the pin 110 (see FIGS. 2A and 9-12). Referring to FIG. 2A, the side door 108 is rotatable about the pin 110 relative to the chassis 106 between the closed position (see FIGS. 1, 2B, 10, 12, and 13) and the open position (see FIGS. 2A and 3).

Figure 6:
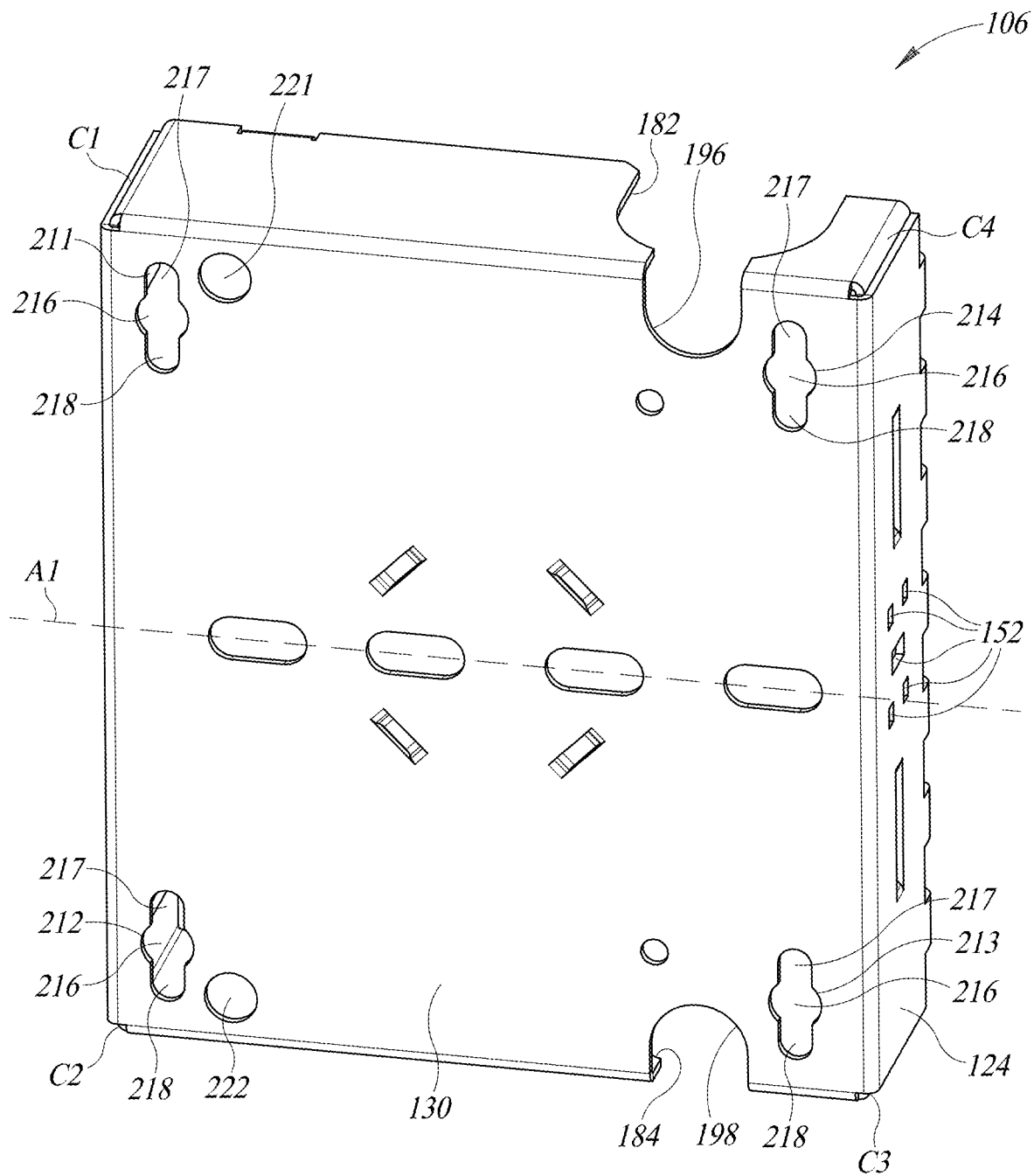
FIG. 6 is a perspective view of a second side of a chassis of the first telecommunications enclosure of FIG. 1.

By way of a non-limiting example, referring to FIG. 6, the back panel 124 may be attached or mounted to a DIN rail by a mounting clip, which is secured to the back panel 124 by one or more fasteners (e.g., screws) secured within one or more through-holes 152 formed in the back panel 124.

Referring to FIG. 3, the front panel 122 may have a cutout portion 160 that extends from the opening 132 partway toward the first side panel 130. The cutout portion 160 may be generally U-shaped. Thus, the cutout portion 160 may be defined by portions 162, 164, and 166 of the front panel 122. The top and bottom portions 162 and 164 extend away from the side portion 166 toward the opening 132. The side portion 166 includes an edge 168 along the cutout portion 160. A projection or ledge 170 extends into the interior 120 from the edge 168. The ledge 170 may be substantially parallel with the first side panel 130. In the illustrated embodiment, the ledge 170 is positioned midway between the top and bottom portions 162 and 164 and extends only partway toward the top and bottom portions 162 and 164. The top portion 162 includes a first through-hole 172 and the bottom portion 164 includes a second through-hole 174. The first and second through-holes 172 and 174 are both spaced apart from the cutout portion 160. At least one of the top and bottom panels 126 and 128 includes a cam receiving aperture or slot 178. In the illustrated embodiment, the cam receiving slot 178 is formed in the bottom panel 128.

Figure 5:
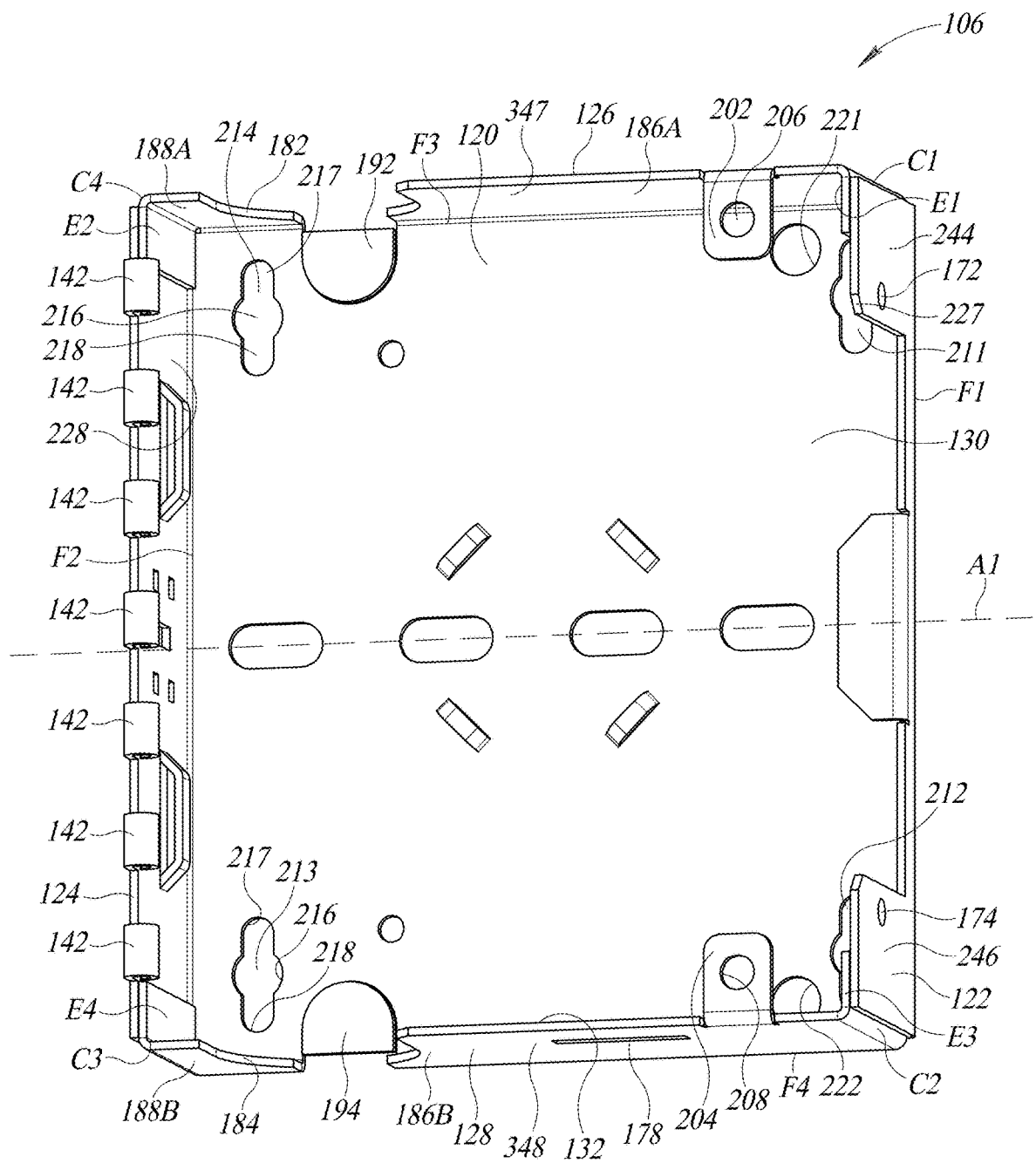
FIG. 5 is a perspective view into an opening on a first side of a chassis of the first telecommunications enclosure of FIG. 1.

Referring to FIG. 5, the first side panel 130 may be symmetric along an axis "A1" extending between the front and back panels 122 and 124 midway between the top and bottom panels 126 and 128, which include through-holes 182 and 184, respectively. As will be described below, the through-holes 182 and 184 are configured to receive the grommets 112A and 112B (see FIGS. 1, 3, 4, 9, 11, and 13), respectively. The through-holes 182 and 184 may be open along the opening 132. Thus, in such embodiments, the through-holes 182 and 184 are in communication with both the interior 120 and the opening 132. In the illustrated embodiment, the through-holes 182 and 184 are positioned directly across the interior 120 from one another and are positioned nearer the back panel 124 than the front panel 122. The through-holes 182 and 184 may extend from the opening 132 to the first side panel 130. In such embodiments, the through-hole 182 bifurcates the top panel 126 into front and back portions 186A and 188A and the through-hole 184 bifurcates the bottom panel 128 into front and back portions 186B and 188B.

The first side panel 130 may have removable or knockout portions 192 and 194 positioned near the through-holes 182 and 184, respectively. When the knockout portions 192 and 194 are removed, they create openings 196 and 198, respectively, as shown in FIG. 6 with the openings 196 and 198 being contiguous with the through-holes 182 and 184, respectively.

Referring to FIG. 5, the top and bottom panels 126 and 128 include inwardly projecting portions 202 and 204, respectively. The inwardly projecting portions 202 and 204 extend into the opening 132 and overhang the first side panel 130. The inwardly projecting portions 202 and 204 include through-holes 206 and 208, respectively. As will be described below, the through-holes 206 and 208 are configured to receive a portion of the fastener assemblies 114A and 114B (see FIGS. 1, 2B, 3, 9, 12, and 13), respectively.

The first side panel 130 may have removable or knockout portions 192 and 194 positioned near the through-holes 182 and 184, respectively. When the knockout portions 192 and 194 are removed, they create openings 196 and 198, respectively, as shown in FIG. 6, with the openings 196 and 198 being contiguous with the through-holes 182 and 184, respectively.

The first side panel 130 includes four through-holes 211-214 positioned near the corners C1-C4, respectively. Each of the through-holes 211-214 has a larger portion 216 flanked by smaller portions 217 and 218. The larger portion 216 is configured to receive the head 224 of one of the fasteners 116 (see e.g., FIG. 2B). The smaller portions 217 and 218 are configured to allow the threaded shaft 226 of one of the fasteners 116 to extend therethrough but are too small to allow the head 224 and one of the nuts 118 to pass therethrough (see e.g., FIGS. 2A, 2B, 8 and 13). Referring to FIG. 1, as mentioned above, the first enclosure 100A is mounted on the wall 104 (e.g., by one or more fasteners, not shown). For example, a piece of plywood (not shown) may be installed on the wall 104 and four wood screws may be inserted one each through each the four through-holes 211-214 (see FIGS. 5, 6, and 13) and screwed into the plywood.

The first side panel 130 has through-holes 221 and 222 configured to allow the fastener assemblies 114A and 114B (see FIGS. 1, 2B, 3, 9, 12, and 13), respectively, to pass therethrough. Thus, the through-holes 221 and 222 are aligned with the through-holes 206 and 208, respectively.

The chassis 106 may be constructed from a single sheet of material (e.g., sheet metal). In the embodiment illustrated in FIG. 5, the front panel 122, the back panel 124, the top panel 126, and the bottom panel 128 are folded in the same direction along folds F1-F4 to define the first side panel 130. Opposite end portions E1 and E2 of the top panel 126 are folded toward one another. The end portion E1 is attached (e.g., adhered, welded, and the like) to an inwardly facing surface 227 of the front panel 122 at the top flange portion 244. Together, the top panel 126 and the top flange portion 244 define the corner C1. The end portion E2 is attached to an inwardly facing surface 228 of the back panel 124. Together, the top panel 126 and the back panel 124 define the corner C4. Similarly, opposite end portions E3 and E4 of the bottom panel 128 are folded toward one another. The end portion E3 is attached (e.g., adhered, welded, and the like) to the inwardly facing surface 227 of the front panel 122 at the bottom flange portion 246. Together, the bottom panel 128 and the bottom flange portion 246 define the corner C2. The end portion E4 is attached to the inwardly facing surface 228 of the back panel 124. Together, the bottom panel 128 and the back panel 124 define the corner C3.

Door

Figure 7:
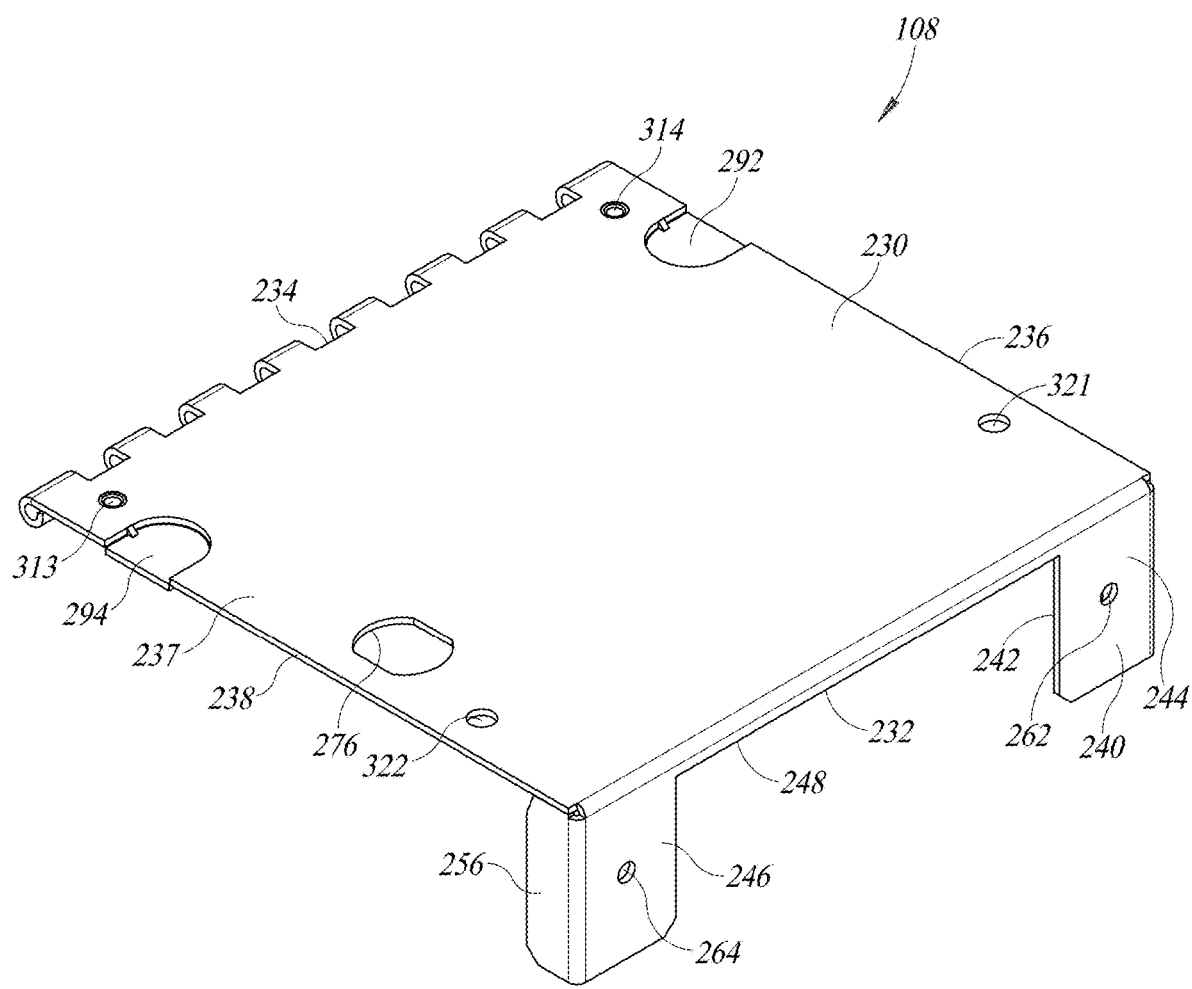
FIG. 7 is a perspective view of an outside of the side door of the first telecommunications enclosure of FIG. 1.
Figure 8:
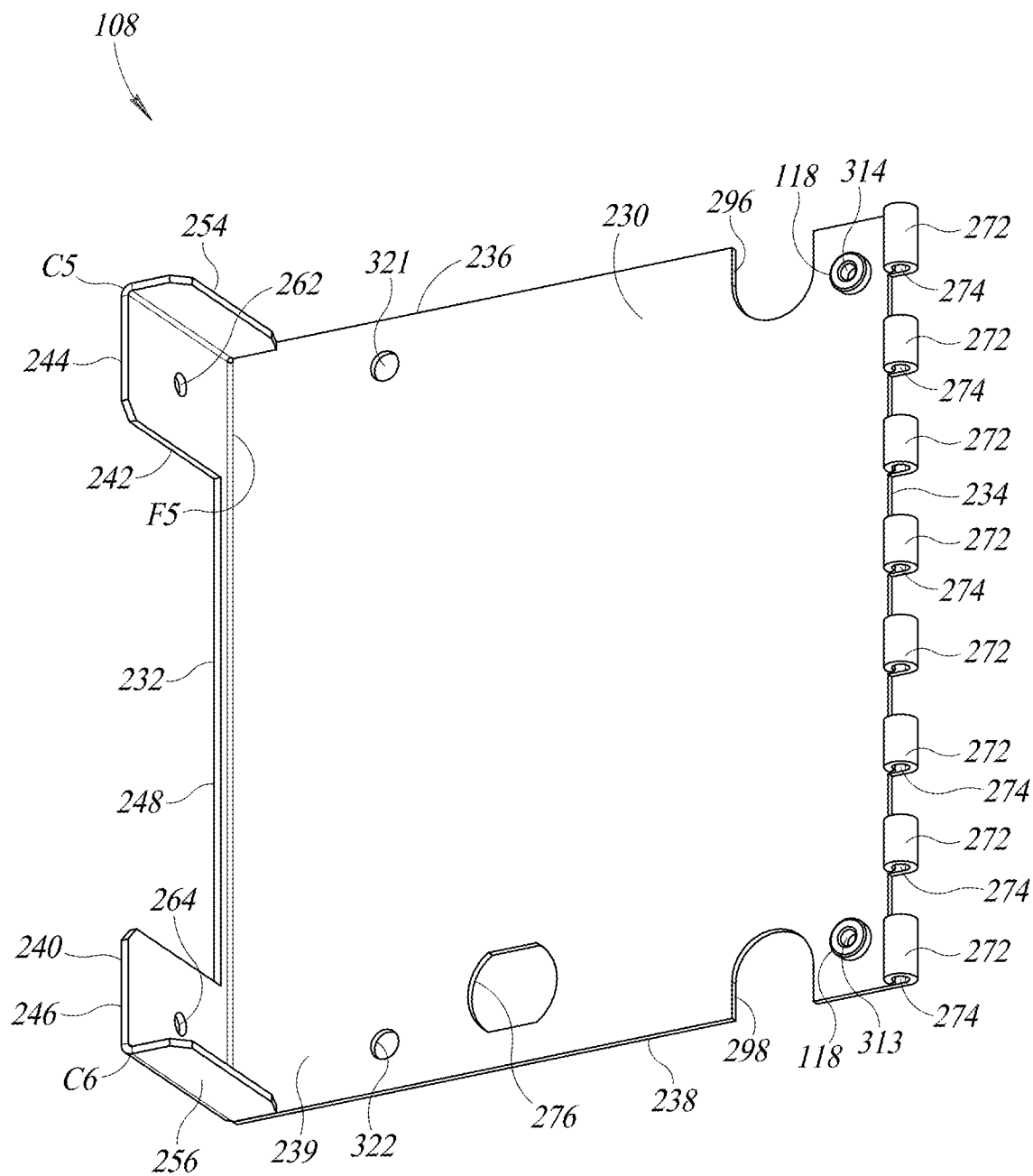
FIG. 8 is a perspective view of an inside of the side door of the first telecommunications enclosure of FIG. 1.

Referring to FIGS. 7 and 8, the side door 108 includes a second side panel 230 with a front portion 232 opposite a back portion 234 and top portion 236 opposite a bottom portion 238. The second side panel 230 has an outwardly facing surface 237 opposite an inwardly facing surface 239.

The front portion 232 of the second side panel 230 includes a flange 240 that extends toward the first side panel 130 (see FIGS. 3-6, 11, and 13). The flange 240 includes a central cutout portion 242 that may be generally U-shaped. The cutout portion 242 is positioned adjacent to the cutout portion 160 formed in the chassis 106 when the side door 108 is in the closed position (see FIGS. 1, 2B, 3, 10, 12, and 13) and is defined by portions 244-248 of the flange 240. The top and bottom flange portions 244 and 246 extend away from the side flange portion 248 toward the first side panel 130 when the side door 108 is in the closed position (see FIGS. 1, 2B, 3, 10, 12, and 13).

The second side panel 230 is longer than the first side panel 130 along the axis "A1" (see FIGS. 5 and 6). Thus, the flange 240 is spaced apart forwardly from the front panel 122 when the side door 108 is in the closed position (see FIGS. 1, 2B, 10, 12, and 13). Through-holes 262 and 264 are formed in the top and bottom flange portions 244 and 246, respectively. The through-holes 262 and 264 are offset from the through-holes 172 and 174, respectively, when the side door 108 is in the closed position (see FIGS. 1, 2B, 10, 12, and 13).

The second side panel 230 is configured to be positioned substantially parallel with the first side panel 130 of the chassis 106 when the side door 108 is in the closed position (see FIGS. 1, 2B, 10, 12, and 13). As mentioned above, the side door 108 forms the second leaf of the hinge 140. The back portion 234 of the second side panel 230 includes a second series of hinge knuckles 272 each having a through-channel 274. The through-channels 274 are aligned with one another and configured to receive the pin 110 (see FIGS. 2A and 8-12).

Figure 9:
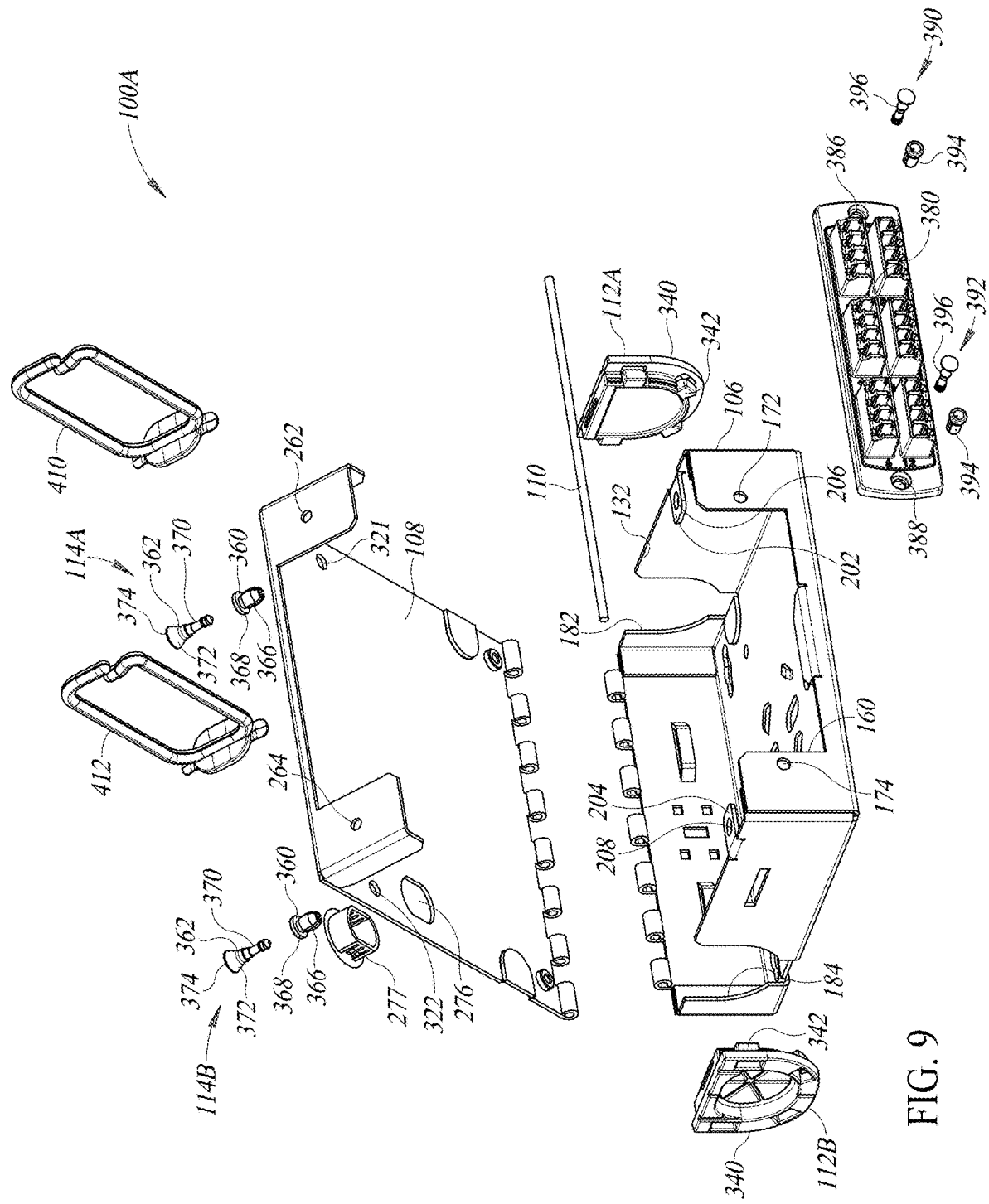
FIG. 9 is an exploded perspective view of the first telecommunications enclosure of FIG. 1 illustrated with a patching interface assembly, a plug, and cable saddles.
Figure 10:
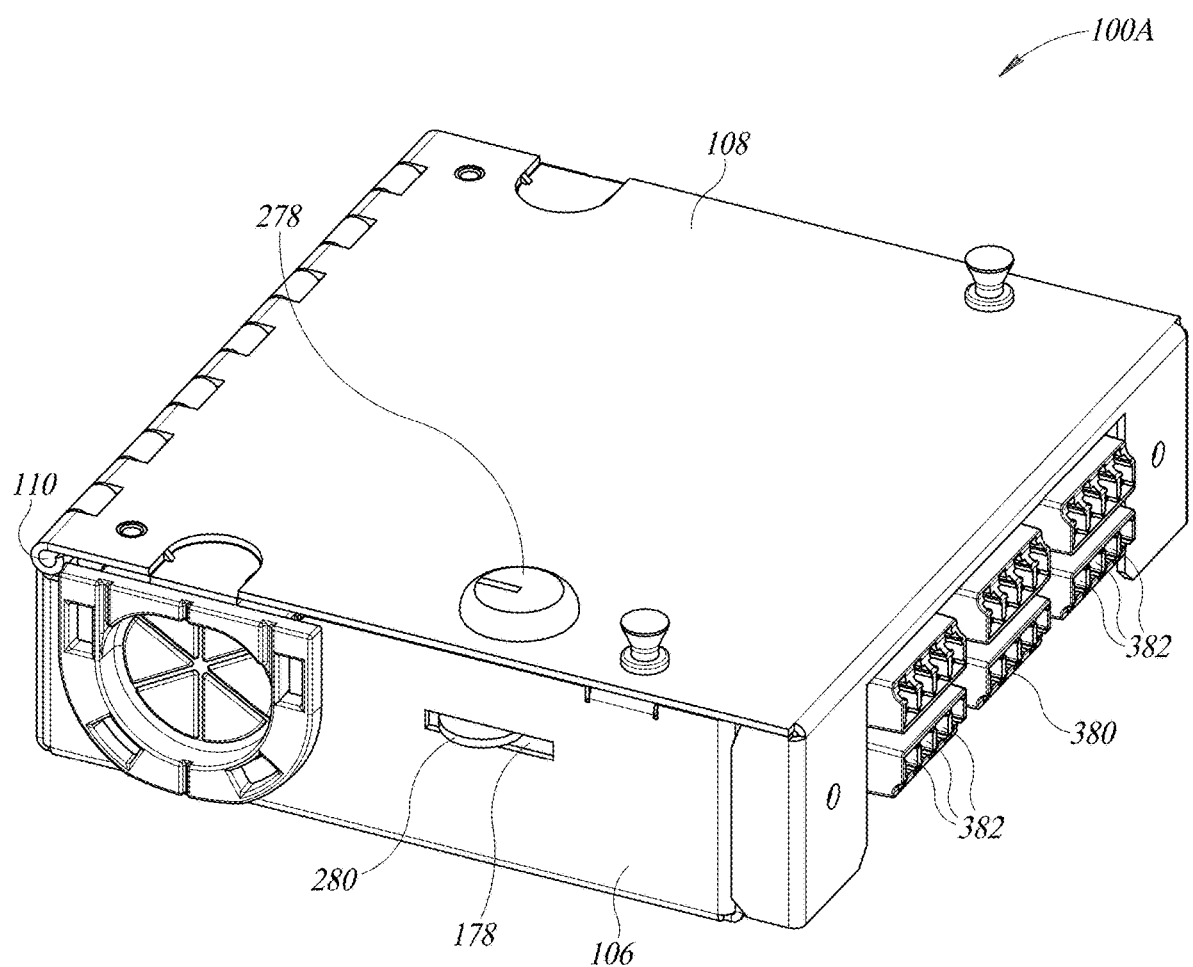
FIG. 10 is a perspective view of the first telecommunications enclosure of FIG. 1 illustrated with the patching interface assembly and a lock.

The second side panel 230 includes a lock aperture 276 configured to receive a plug 277 (see FIGS. 1-3, 9, and 12) or an optional lock 278 (see FIG. 10). As shown in FIG. 10, the optional lock 278 may be implemented as cylinder lock with a movable cam 280. The lock aperture 276 may be positioned so that when the side door 108 is in the closed position, the cam 280 may be selectively positioned inside the cam receiving slot 178. The lock 278 is operable by a user to selectively position the cam 280 inside the cam receiving slot 178 to lock the side door 108 in the closed position and selectively remove the cam 280 from the cam receiving slot 178 to unlock the side door 108 so that the unlocked side door 108 may be rotated to the open position (see FIGS. 2A and 3), if desired. By way of a non-limiting example, the optional lock 278 may be operated by turning a key (not shown).

Referring to FIGS. 7 and 8, the second side panel 230 has removable or knockout portions 292 and 294 positioned along the top and bottom portions 236 and 238, respectively. When the knockout portions 292 and 294 are removed, they created openings 296 and 298, respectively, that are adjacent to and contiguous with the through-holes 182 and 184 (see FIGS. 3, 5-7, and 9), respectively. Also, in the embodiment illustrated, the openings 296 and 298 are aligned with the openings 196 and 198 (see FIGS. 6 and 13), respectively, and are directly across the interior 120 from the openings 196 and 198, respectively. The openings 296 and 298 and the openings 196 and 198 are each configured to allow one or more cables to pass therethrough. Thus, the telecommunications cables may enter and exit the interior 120 through one or more of the openings 296 and 298 and the openings 196 and 198.

The second side panel 230 includes through-holes 313 and 314. The through-hole 313 is aligned with the smaller portion 218 of the through-hole 213, and the through-hole 314 is aligned with the smaller portion 217 of the through-hole 214 (see FIGS. 5, 6, and 13). Each of the through-holes 313 and 314 is configured to receive the threaded shaft 226 of a different one of the fasteners 116 (see FIG. 2B). In the embodiment illustrated, the nuts 118 are each centered on one of the through-holes 313 and 314 and attached to the second side panel 230 on its inwardly facing surface 239.

The second side panel 230 has through-holes 321 and 322, in which the fastener assemblies 114A and 114B (see FIGS. 1, 2B, 3, 9, 12, and 13), respectively, are mounted. When mounted on the side door 108, the fastener assemblies 114A and 114B are movable with the side door 108 as a unit. The through-holes 321 and 322 are aligned with the through-holes 221 and 222 (see FIGS. 5, 6, and 13), respectively. In the embodiment illustrate, the through-holes 221 and 222 and the through-holes 321 and 322 are each substantially round. The through-holes 221 and 222 each have a substantially identical first diameter and the through-holes 321 and 322 each have a substantially identical second diameter. The first diameter is larger than the second diameter.

Referring to FIG. 3, the side door 108 may be constructed from a single sheet of material (e.g., sheet metal). In the embodiment illustrated, the flange 240 is folded along a fold F5 to define the second side panel 230. The top flange portion 244 is bent to define a top backward extending portion 254 and the bottom flange portion 246 is bent to define a bottom backward extending portion 256. Thus, a top corner C5 is defined by the top flange portion 244 and the top backward extending portion 254 and a bottom corner C6 is defined by the bottom flange portion 246 and the bottom backward extending portion 256. The top backward extending portion 254 is aligned with the top panel 126 when the side door 108 is in the closed position (see FIGS. 1, 2B, 10, 12, and 13). Similarly, the bottom backward extending portion 256 is aligned with the bottom panel 128 when the side door 108 is in the closed position.

Grommet(s)

Referring to FIG. 3, the first enclosure 100A includes the pair of spaced apart the grommets 112A and 112B. The grommets 112A and 112B are substantially identical to one another and configured to be positioned inside the through-holes 182 and 184 (see FIGS. 5, 6, and 9), respectively. As mentioned above, the through-holes 182 and 184 may each open into the opening 132. Thus, the grommets 112A and 112B may be slid into the through-holes 182 and 184 from a position above the opening 132.

Each of the grommets 112A and 112B includes first and second outwardly extending projecting portions 340 and 342. Referring to FIG. 4, the first outwardly extending projecting portion(s) 340 of the grommet 112A are configured to abut a portion of an outwardly facing surface 346 of the top panel 126 that surrounds the through-hole 182 (see FIGS. 5, 6, and 9) and the second outwardly extending projecting portion(s) 342 of the grommet 112A are configured to abut a portion of an inwardly facing surface 347 of the top panel 126 that surrounds the through-hole 182. Thus, the top panel 126 is sandwiched between the first and second outwardly extending projecting portions 340 and 342 of the grommet 112A, which maintain the grommet 112A inside the through-hole 182.

Similarly, the first outwardly extending projecting portion(s) 340 of the grommet 112B are configured to abut a portion of an outwardly facing surface 348 of the bottom panel 128 that surrounds the through-hole 184 (see FIGS. 5, 6, and 9) and the second outwardly extending projecting portion(s) 342 of the grommet 112B are configured to abut a portion of an inwardly facing surface 349 of the bottom panel 128 that surrounds the through-hole 184. Thus, the bottom panel 128 is sandwiched between the first and second outwardly extending projecting portions 340 and 342 of the grommet 112B, which maintain the grommet 112B inside the through-hole 184.

The grommets 112A and 112B each include one or more passageways 350 through which telecommunications (e.g., fiber optic) cables may pass. Thus, the telecommunications cables may enter and exit the interior 120 through the grommets 112A and 112B.

Fastener Assemblies

Referring to FIG. 9, as mentioned above, the fastener assemblies 114A and 114B are configured to be mounted in the through-holes 321 and 322, respectively, formed in the side door 108. The fastener assemblies 114A and 114B are configured to selectively and releasable lock the side door 108 in the closed position (see FIGS. 1, 2B, 10, 12, and 13) with respect to the chassis 106.

Figure 12:
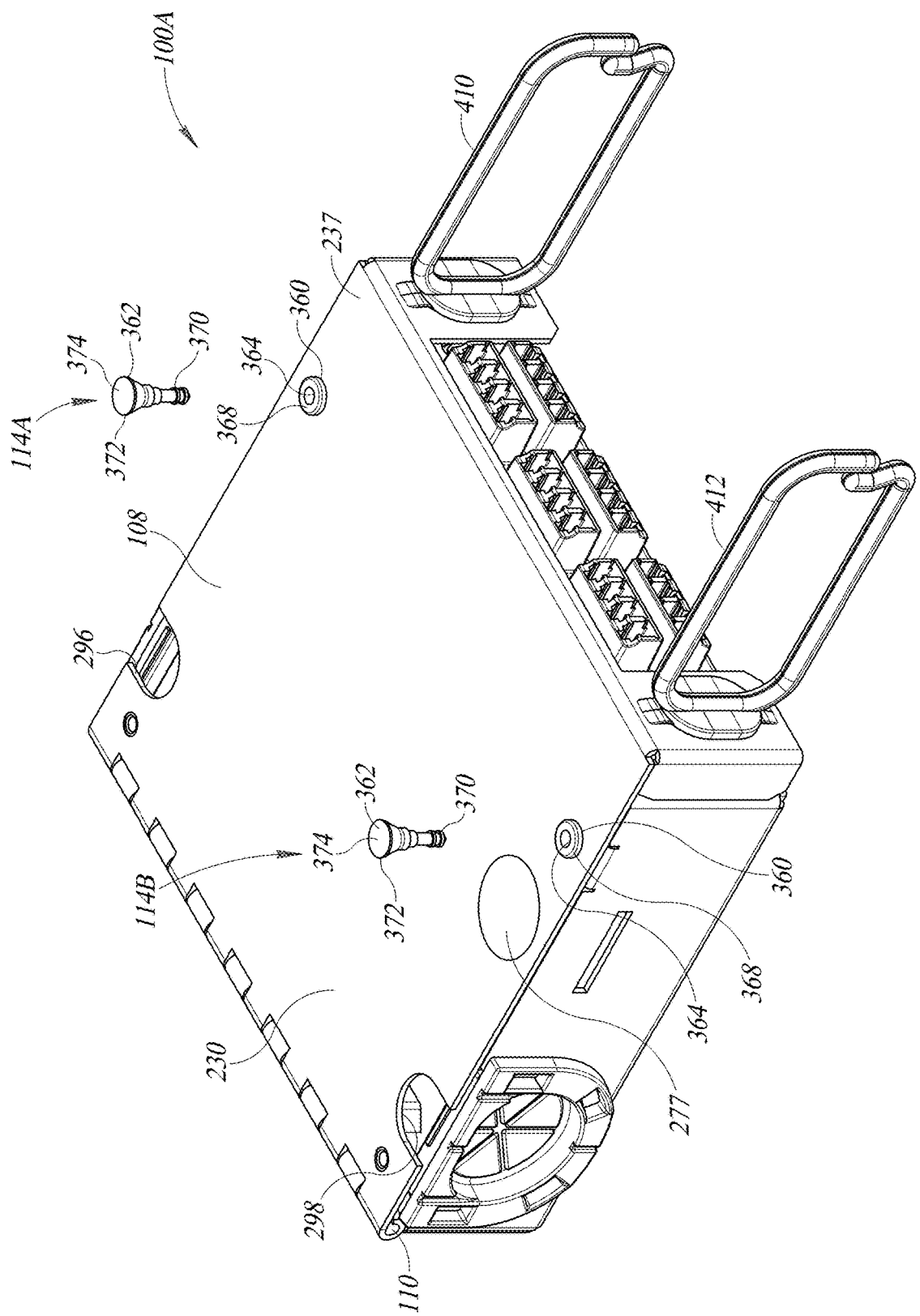
FIG. 12 is a perspective view of the first telecommunications enclosure of FIG. 1 illustrated with the patching interface assembly, the plug, and the cable saddles.
Figure 13:
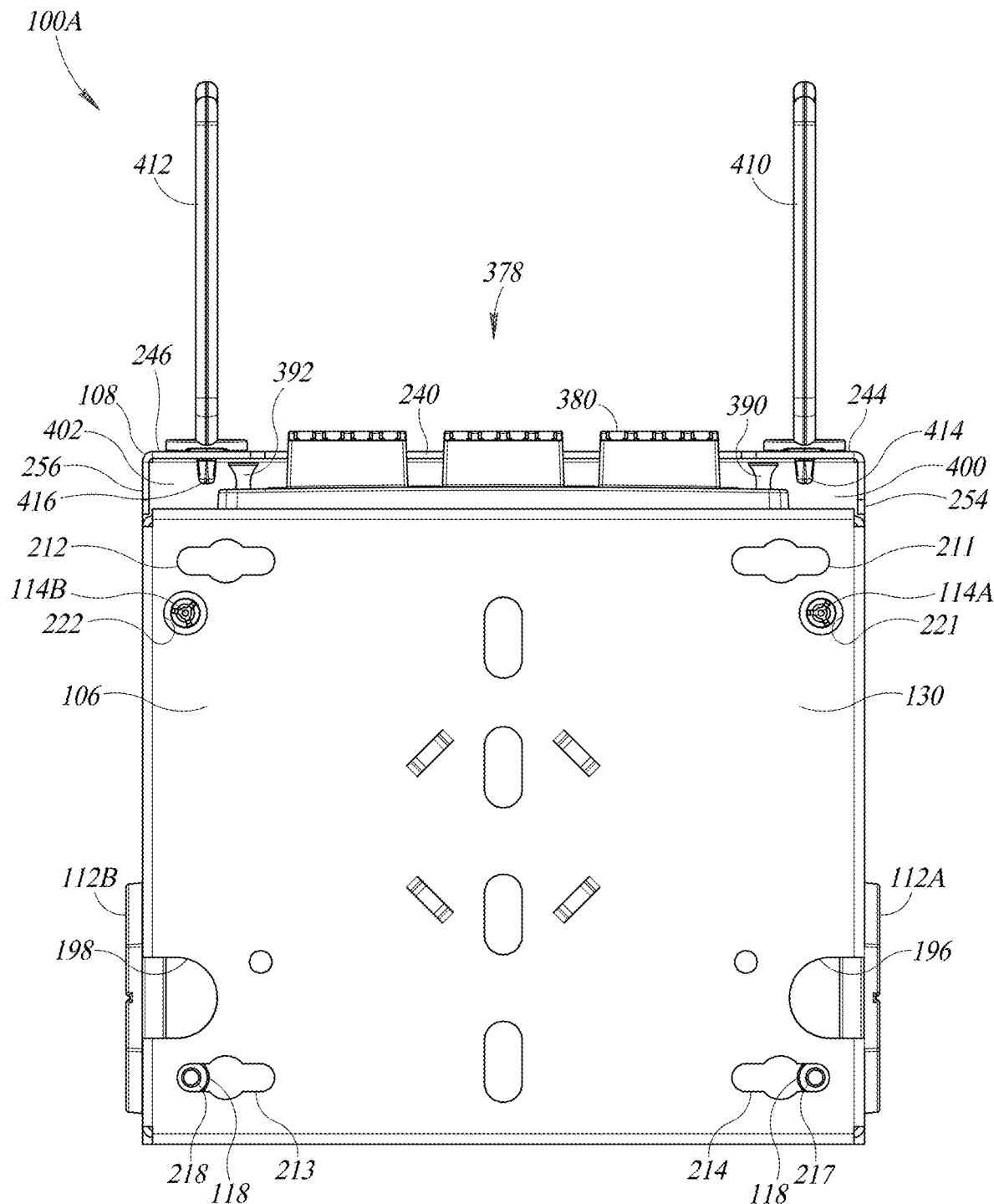
FIG. 13 is a side view of the first telecommunications enclosure of FIG. 1 illustrated with the patching interface assembly and the cable saddles.

Each of the fastener assemblies 114A and 114B includes a grommet portion 360 and a plunger portion 362. Referring to FIGS. 9 and 12, the grommet portion 360 has a through-channel 364 that extends through both an inner portion 366 and an outer portion 368. The inner portions 366 of the fastener assemblies 114A and 114B are configured to be mounted in the through-holes 321 and 322, respectively. The outer portions 368 of the fastener assemblies 114A and 114B are too large to be received inside the through-holes 321 and 322, respectively. The outer portions 368 of the fastener assemblies 114A and 114B rest on the outwardly facing surface 237 of the second side panel 230. The inner portions 366 of the fastener assemblies 114A and 114B are received inside the through-holes 206 and 208, respectively, when the side door 108 is in the closed position (see FIGS. 1, 2B, 4, 5, 9, 10, 12, and 13).

The plunger portion 362 has an anchor portion 370 and a grip portion 372. The anchor portions 370 of the fastener assemblies 114A and 114B are configured to be inserted into the through-channels 364 of the fastener assemblies 114A and 114B, respectively. The anchor portion 370 is movable by the grip portion 372 between locked and unlocked positions inside the through-channel 364 of the grommet portion 360. When the anchor portions 370 are placed in locked positions, the anchor portions 370 push outwardly against the inner portions 366 of the fastener assemblies 114A and 114B with sufficient outwardly directed force to cause the inner portions 366 to spread outwardly and prevent the grommet portions 360 from being removed from the through-holes 206 and 208 (see FIGS. 4, 5, and 9), respectively. Thus, the side door 108 is maintained in the closed position by the fastener assemblies 114A and 114B. On the other hand, when the anchor portions 370 are placed in unlocked positions, the anchor portions 370 do not push outwardly against the inner portions 366 with sufficient outwardly directed force to cause the inner portions 366 of the fastener assemblies 114A and 114B to spread outwardly. Thus, the grommet portions 360 of the fastener assemblies 114A and 114B may be removed from the through-holes 206 and 208, respectively, when the plunger portions 362 are in the unlocked positions. In other words, the fastener assemblies 114A and 114B may be removed from the chassis 106 when the plunger portions 362 are in the unlocked positions. In this manner, when the plunger portions 362 are in the unlocked positions, the side door 108 may be rotated to the open position, if desired.

The plunger portion 362 may be transitioned from the unlocked position to the locked position by pushing inwardly on the grip portion 372 until the plunger portion 362 moves to the locked position. The plunger portion 362 may be transitioned from the locked position to the unlocked position by pulling outwardly on the grip portion 372 until the plunger portion 362 moves to the unlocked position. The grip portion 372 is too large to enter the through-channel 364. Thus, the grip portions 372 of the fastener assemblies 114A and 114B remain outside the grommet portions 360 of the fastener assemblies 114A and 114B, respectively.

Referring to FIG. 2B, the grip portions 372 of the fastener assemblies 114A and 114B of the first enclosure 100A are configured to be received inside the through-holes 221 and 222, respectively, of the second enclosure 100B. The grip portion 372 has a free distal end portion 374. The free distal end portions 374 of the fastener assemblies 114A and 114B are small enough to pass through the through-holes 221 and 222, respectively. When the second enclosure 100B is attached to the side door 108 of the first enclosure 100A, the side door 108 of the second enclosure 100B must be opened so that a user may transition (e.g., pull) the plunger portions 362 of the fastener assemblies 114A and 114B from locked positions to unlocked positions. If the side door 108 of the second enclosure 100B is locked in the closed position (e.g., by the lock 278 in FIG. 10), the grip portions 372 of the fastener assemblies 114A and 114B may not be accessed. Thus, if the side door 108 of the first enclosure 100A is in the closed position and the plunger portions 362 of the fastener assemblies 114A and 114B of the first enclosure 100A are in locked positions, the side door 108 of the first enclosure 100A may not be opened when the side door 108 of the second enclosure 100B is locked in the closed position by the lock 278.

By way of a non-limiting example, the fastener assemblies 114A and 114B may be implemented as plunger captive panel latches, and the like.

Additional Optional Component(s)

The first enclosure 100A may include one or more additional optional components. Referring to FIG. 9, the first enclosure 100A may include the plug 277 configured to fill the lock aperture 276. Alternatively, referring to FIG. 10, the first enclosure 100A may include the lock 278 configured to be installed in the lock aperture 276 (see FIGS. 7-9).

Referring to FIG. 10, accessories may be positioned inside the interior 120 and/or the cutout portion 160 of the chassis 106. In the example illustrated in FIG. 11, a patching interface assembly 378 is mounted in the cutout portion 160. The patching interface assembly 378 includes a patching panel 380, a first fastener assembly 390, and a second fastener assembly 392.

Figure 11:
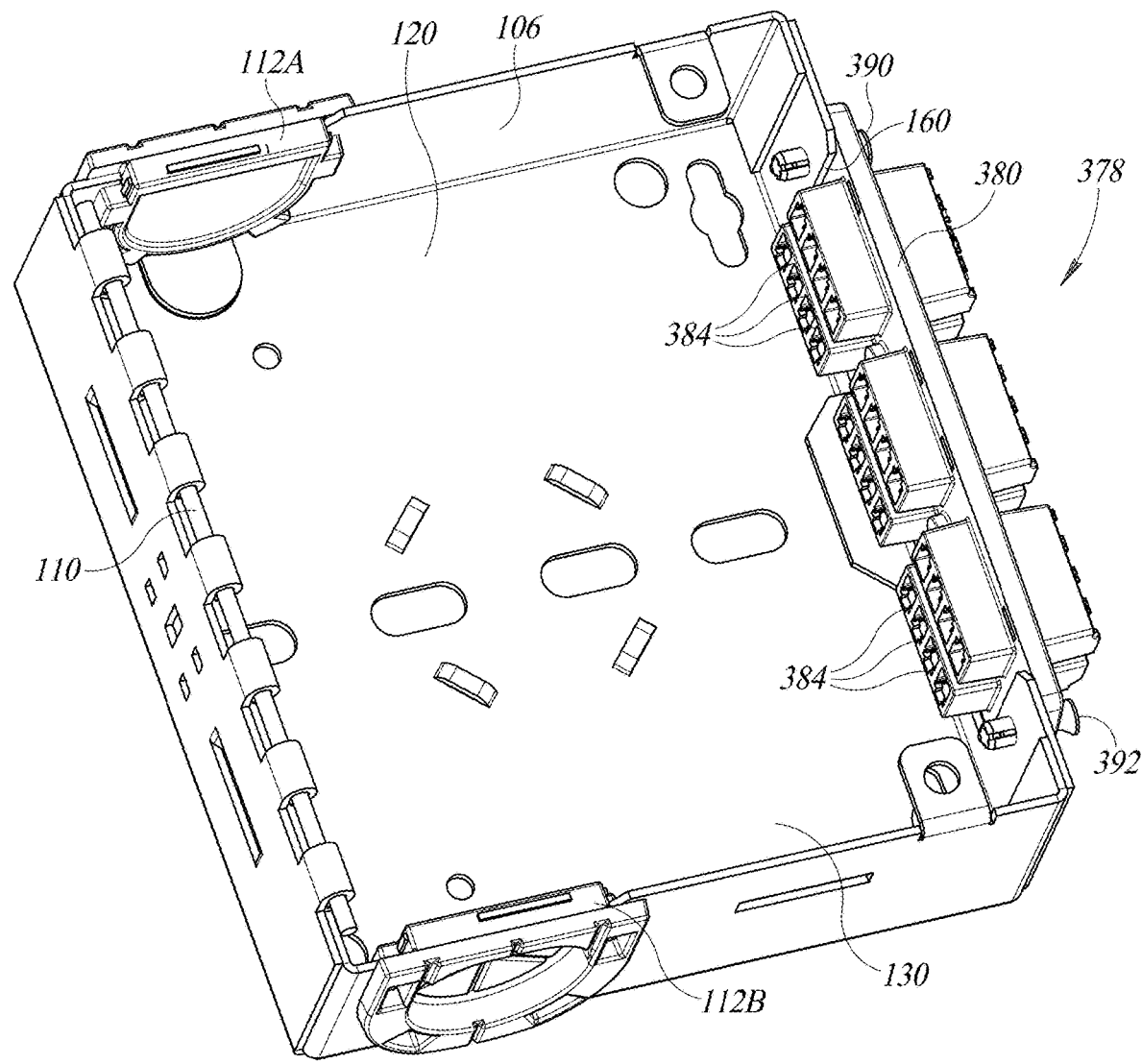
FIG. 11 is a perspective view of the first telecommunications enclosure of FIG. 1 illustrated with the patching interface assembly and omitting its side door.

Referring to FIG. 10, the patching panel 380 includes at least one aperture that is accessible through the cutout portions 160 and 242 when the side door 108 is in the closed position (see FIGS. 1, 2B, 10, 12, and 13). Each such aperture is configured to receive a telecommunications connector (e.g., of a connectorized telecommunications cable, not shown). In the embodiment illustrated, the at least one aperture is implemented as one or more outwardly facing ports 382 each configured receive a telecommunications connector (not shown). In the embodiment illustrated, the telecommunications connector is a fiber optic connector. However, in alternate embodiments, the telecommunications connector may be implemented as an electrical connector. Referring to FIG. 11, the patching panel 380 also has one or more inwardly facing ports 384 each configured to receive a telecommunications cable (not shown). In the embodiment illustrated, the telecommunications cable is a fiber optic cable. However, in alternate embodiments, the telecommunications cable may be implemented as an electrical cable. The patching panel 380 is configured to provide a connection between each telecommunications connector and one of the telecommunications cables.

In the embodiment illustrated in FIG. 9, the patching panel 380 has first and second through-holes 386 and 388 configured to be aligned with the first and second through-holes 172 and 174, respectively, of the chassis 106. In such embodiments, the patching panel 380 may be releasably attached to the front panel 122 by the first and second fastener assemblies 390 and 392. The first fastener assembly 390 is inserted into the aligned first through-holes 386 and 172. The second fastener assembly 392 is inserted into the aligned second through-holes 388 and 174.

The first and second fastener assemblies 390 and 392 may be substantially identical to the fastener assemblies 114A and 114B, respectively. Thus, the first and second fastener assemblies 390 and 392 each includes a grommet portion 394 and a plunger portion 396 that are substantially identical to the grommet portion 360 and the plunger portion 362 (see FIGS. 9 and 12), respectively. The grommet portion 394 of the first fastener assembly 390 is inserted through the first through-hole 386 when the first through-hole 386 is aligned with the first through-hole 172. Then, the plunger portion 396 of the first fastener assembly 390 is inserted into the grommet portion 394 of the first fastener assembly 390. Similarly, the grommet portion 394 of the second fastener assembly 392 is inserted through the second through-hole 388 when the second through-hole 388 is aligned with the second through-hole 174. Then, the plunger portion 396 of the second fastener assembly 392 is inserted into the grommet portion 394 of the second fastener assembly 392.

The plunger portions 396 of the first and second fastener assemblies 390 and 392 are positionable in locked and unlocked positions with respect to the grommet portions 394. The patching panel 380 may be attached or locked to the chassis 106 by placing the plunger portions 396 of the first and second fastener assemblies 390 and 392 in the locked positions, which causes the grommet portions 394 to spread outwardly and prevents their removal from the through-holes 172 and 174, respectively. The patching panel 380 may be removed from the chassis 106 by the transitioning the plunger portions 396 of the first and second fastener assemblies 390 and 392 to their unlocked positions, which allows the grommet portions 394 to be removed from the through-holes 172 and 174, respectively. Thus, when the side door 108 is in the open position, the flange 240 is spaced apart from the first and second fastener assemblies 390 and 392 and allows the first and second fastener assemblies 390 and 392 to be removed from the chassis 106.

Referring to FIG. 3, as mentioned above, the second side panel 230 is longer than the first side panel 130 along the axis "A1" (see FIGS. 5 and 6). Thus, the side door 108 overhangs the chassis 106 and positions the top and bottom flange portions 244 and 246 in front of the front panel 122. Referring to FIG. 11, the first and second fastener assemblies 390 and 392 are each configured to allow the side door 108 (see FIGS. 1-3, 7-10, 12, and 13) to move unimpeded between the closed and open positions and vice versa. In other words, the first and second fastener assemblies 390 and 392 fit within gaps 400 and 402 defined between the front panel 122 and the top and bottom flange portions 244 and 246. The top and bottom flange portions 244 and 246 cover the first and second fastener assemblies 390 and 392, respectively, when the side door 108 is in the closed position. Thus, the plunger portions 396 of the first and second fastener assemblies 390 and 392 cannot be transitioned from locked positions to unlocked positions. This means that the patching interface assembly 378 cannot be removed when the side door 108 is locked (e.g., by the optional lock 278) in the closed position and the plunger portions 396 are in locked positions. In this manner, the interior 120 cannot be accessed through the cutout portions 160 and 242.

Referring to FIGS. 3, 7-9, 12, and 13, the first enclosure 100A may include optional cable saddles 410 and 412. The cable saddles 410 and 412 are configured to help manage cables (not shown) routed into and/or out of the first enclosure 100A. The cable saddles 410 and 412 may have projections 414 and 416, respectively, configured to be mounted in the through-holes 262 and 264, respectively, of the side door 108. The projections 414 and 416 are offset from the first and second fastener assemblies 390 and 392, respectively, so that the projections 414 and 416 fit within the gaps 400 and 402, respectively, alongside the first and second fastener assemblies 390 and 392, respectively.

Exemplary Cable Management

Referring to FIGS. 2A and 2B, as mentioned above, the chassis 106 of the second enclosure 100B may be stacked on and fastened to the side door 108 of the first enclosure 100A (e.g., by the fastener(s) 116). This arrangement doubles the capacity of the wall-space occupied by the first and second enclosures 100A and 100B.

Turning to FIG. 3, one or more cables (not shown) may extend into and out of the first enclosure 100A through the cutout portions 160 and 242, the grommets 112A and 112B, the openings 296 and 298 (see FIGS. 8 and 12) created by removing the knockout portions 292 and 294, respectively, and the openings 196 and 198 (see FIGS. 6 and 13) created by removing the knockout portions 192 (see FIG. 5) and 194, respectively. In other words, referring to FIG. 2B, the first enclosure 100A includes features in both the side door 108 and the chassis 106 configured to allow a cable (not shown) to pass from the first enclosure 100A to the second enclosure 100B and vice versa. This allows the end user (e.g., an installer) to terminate the cable (not shown) at the first enclosure 100A (e.g., at the patching panel 380) and route the cable (not shown) internally through to the first enclosure 100A to the second enclosure 100B. Alternatively, the end user (e.g., an installer) may terminate the cable (not shown) at the second enclosure 100B and route the cable (not shown) internally through to the second enclosure 100B to the first enclosure 100A. By way of another non-limiting example, the end user (e.g., an installer) may insert cables (not shown) independently into each of the first and second enclosures 100A and 100B.

As mentioned above, referring to FIGS. 3 and 5, the knockout portions 192 and 194 are aligned with the knockout portions 292 and 294, respectively, when the side door 108 is in the closed position. Thus, referring to FIGS. 8, 12 and 13, a cable may travel through the openings 196 and 296. Similarly, a cable may travel through the openings 198 and 298. Referring to FIG. 2B, this arrangement allows the interior 120 of the first enclosure 100A to be accessed by opening the side door 108 of the second enclosure 100B. Thus, there is no need to open the side door 108 of the first enclosure 100A, which reduces a likelihood of damaging or interrupting telecommunications (e.g., fiber optic) connections housed in the first enclosure 100A.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A telecommunications enclosure comprising:
   a chassis defining an interior having an opening, the chassis comprising a first cutout portion configured to have at least one patching panel installed therein, the at least one patching panel having an aperture configured to receive a telecommunication connector;
   a patching panel assembly comprising the at least one patching panel, the patching panel assembly comprising fasteners configured to attach the patching panel assembly to the chassis;
   a door hingedly attached to the chassis, a like telecommunications enclosure being mountable on the door, the door being rotatable relative to the chassis between closed and open positions when the like telecommunications enclosure is mounted thereto, the door blocking the opening when the door is in the closed position, the door allowing access to the interior through the opening when the door is in the open position, a through-hole being formed in at least one of the chassis and the door, the through-hole being configured to allow a telecommunications cable connected to the at least one patching panel to pass therethrough and exit the interior of the chassis, the first cutout portion being spaced apart from the through-hole, the door comprising a second cutout portion spaced apart from the through-hole, the second cutout portion being aligned with the first cutout portion when the door is in the closed position, the aperture being accessible through the second cutout portion when the door is in the closed position; and a lock installed in the door, the lock being operable to move a cam between locked and unlocked positions, the cam engaging the chassis and preventing the door from being rotated to the open position when the cam is in the locked position and the door is in the closed position, the door blocking access to and preventing removal of the fasteners from the chassis when the door is in the closed position.

2. The telecommunications enclosure of claim 1, further comprising:
at least one fastener assembly configured to releasably lock the door in the closed position.

3. The telecommunications enclosure of claim 1, further comprising:
first and second fasteners configured to attach the like telecommunications enclosure to the door.

4. The telecommunications enclosure of claim 1, wherein the chassis has a substantially planar side panel opposite the door,
the side panel is mountable directly on a wall, and
a like side panel of the like telecommunications enclosure is mountable on the door.

5. The telecommunications enclosure of claim 4, wherein the through-hole is a first through-hole, the first through-hole is formed in the chassis, and the telecommunications enclosure further comprises:
a second through-hole formed in the door, and
the first and second through-holes are aligned with one another across the interior.

6. The telecommunications enclosure of claim 1, wherein the chassis comprises a first side opposite a second side, the first and second sides comprise first and second grommet openings, and the telecommunications enclosure further comprises:
first and second grommets mounted in the first and second grommet openings, respectively, the first and second grommets being configured to allow cables to pass therethrough.

7. The telecommunications enclosure of claim 1, wherein the through-hole is a first through-hole, and the door comprises a flange with a second through-hole formed therein and the telecommunications enclosure further comprises:
a cable saddle configured to be mounted in the second through-hole of the flange.

8. The telecommunications enclosure of claim 1, further comprising:
a removable portion that when removed creates the through-hole.

9. A telecommunications enclosure comprising:
a chassis defining an interior with an opening, the chassis comprising a first cutout portion configured to have at least one patching panel installed therein, the at least one patching panel being attached to the chassis by at least one fastener; and a door hingedly attached to the chassis, a different chassis of a like telecommunications enclosure being mountable on the door, the door being rotatable relative to the chassis between closed and open positions when the like telecommunications enclosure is mounted thereto, the door blocking the opening when the door is in the closed position, the door allowing access to the interior through the opening when the door is in the open position, the door having a flange that covers the at least one fastener and prevents removal of the at least one fastener when the door is in the closed position, the flange being spaced apart from the at least one fastener and allowing the at least one fastener to be removed from the chassis when the door is in the open position.

10. The telecommunications enclosure of claim 9, further comprising:
a lock installed in the door, the lock being operable to move a cam between locked and unlocked positions, the cam engaging the chassis and preventing the door from being rotated to the open position when the cam is in the locked position and the door is in the closed position.

11. The telecommunications enclosure of claim 9, wherein the door includes a second cutout portion aligned with the first cutout portion when the door is in the closed position,
the at least one patching panel has at least one aperture,
the patching panel has an outwardly facing surface and an inwardly facing surface,
each of the at least one aperture is accessible from the outwardly facing surface through the second cutout portion when the door is in the closed position, and
each of the at least one aperture is configured to receive a different telecommunications connector.

12. The telecommunications enclosure of claim 9, further comprising:
a first removable portion that when removed creates a first through-hole, the first removable portion being formed in the chassis; and
a second removable portion that when removed creates a second through-hole, the second removable portion being formed in the door, the first and second removable portions being aligned with one another across the interior.

13. The telecommunications enclosure of claim 9, further comprising:
first and second fasteners configured to attach the different chassis of the like telecommunications enclosure to the door.

14. The telecommunications enclosure of claim 9, wherein the chassis comprises a first side opposite a second side, the first and second sides comprise first and second grommet openings, and the telecommunications enclosure further comprises:
first and second grommets mounted in the first and second grommet openings, respectively, the first and second grommets being configured to allow cables to pass therethrough.

15. The telecommunications enclosure of claim 9, further comprising:
a cable saddle configured to be mounted in a through-hole formed in the flange of the door.

16. A telecommunications enclosure comprising:
a chassis defining an interior having an opening, the chassis comprising first and second through-holes, the first through-hole being configured to have at least one patching panel installed therein, the at least one patching panel having an aperture configured to receive a telecommunication connector, the second through-hole being configured to allow a telecommunications cable connected to the at least one patching panel to pass therethrough and exit the interior of the chassis; and a door hingedly attached to the chassis, the door comprising a third through-hole, the second and third through-holes being aligned with one another across the interior, a like telecommunications enclosure being mountable on the door, the door being rotatable relative to the chassis between closed and open positions when the like telecommunications enclosure is mounted thereto, the door blocking the opening when the door is in the closed position, the door allowing access to the interior through the opening when the door is in the open position, the first through-hole being a first cutout portion spaced apart from the second through-hole, the door including a second cutout portion spaced apart from the third through-hole, the second cutout portion being aligned with the first cutout portion when the door is in the closed position, the aperture being accessible through the second cutout portion when the door is in the closed position, the chassis having a substantially planar side panel opposite the door, the side panel being mountable directly on a wall, a like side panel of the like telecommunications enclosure being mountable on the door.

17. The telecommunications enclosure of claim 16, further comprising:
a patching panel assembly comprising the at least one patching panel, the patching panel assembly comprising fasteners configured to attach the patching panel assembly to the chassis.

18. The telecommunications enclosure of claim 16, further comprising:
at least one fastener assembly configured to releasably lock the door in the closed position.

19. The telecommunications enclosure of claim 16, further comprising:
first and second fasteners configured to attach the like telecommunications enclosure to the door.

20. The telecommunications enclosure of claim 16, wherein the chassis comprises a first side opposite a second side, the first and second sides comprise first and second grommet openings, and the telecommunications enclosure further comprises:
first and second grommets mounted in the first and second grommet openings, respectively, the first and second grommets being configured to allow cables to pass therethrough.

21. The telecommunications enclosure of claim 16, wherein the door comprises a flange with a fourth through-hole formed therein and the telecommunications enclosure further comprises:
a cable saddle configured to be mounted in the fourth through-hole of the flange.

22. The telecommunications enclosure of claim 16, wherein the telecommunications cable is a first telecommunications cable, and
the third through-hole is configured to allow a second telecommunications cable connected to the at least one patching panel to pass therethrough and exit the interior of the chassis.

23. The telecommunications enclosure of claim 16, further comprising:
a removable portion that when removed creates the second through-hole.

24. A telecommunications enclosure comprising:
a chassis defining an interior having an opening, the chassis comprising a first through-hole configured to have at least one patching panel installed therein, the at least one patching panel having an aperture configured to receive a telecommunication connector; and
a door hingedly attached to the chassis, a like telecommunications enclosure being mountable on the door, the door being rotatable relative to the chassis between closed and open positions when the like telecommunications enclosure is mounted thereto, the door blocking the opening when the door is in the closed position, the door allowing access to the interior through the opening when the door is in the open position, a second through-hole being formed in at least one of the chassis and the door, the second through-hole being configured to allow a telecommunications cable connected to the at least one patching panel to pass therethrough and exit the interior of the chassis, the first through-hole being a first cutout portion spaced apart from the second through-hole, the door including a second cutout portion spaced apart from the second through-hole, the second cutout portion being aligned with the first cutout portion when the door is in the closed position, the aperture being accessible through the second cutout portion when the door is in the closed position.

25. The telecommunications enclosure of claim 24, further comprising:
a patching panel assembly comprising the at least one patching panel, the patching panel assembly comprising fasteners configured to attach the patching panel assembly to the chassis.

26. The telecommunications enclosure of claim 24, further comprising:
at least one fastener assembly configured to releasably lock the door in the closed position.

27. The telecommunications enclosure of claim 24, further comprising:
first and second fasteners configured to attach the like telecommunications enclosure to the door.

28. The telecommunications enclosure of claim 24, wherein the chassis has a substantially planar side panel opposite the door,
the side panel is mountable directly on a wall, and
a like side panel of the like telecommunications enclosure is mountable on the door.

29. The telecommunications enclosure of claim 24, wherein the chassis comprises a first side opposite a second side, the first and second sides comprise first and second grommet openings, and the telecommunications enclosure further comprises:
first and second grommets mounted in the first and second grommet openings, respectively, the first and second grommets being configured to allow cables to pass therethrough.

30. The telecommunications enclosure of claim 24, wherein the door comprises a flange with a third through-hole formed therein and the telecommunications enclosure further comprises:
a cable saddle configured to be mounted in the third through-hole of the flange.

31. The telecommunications enclosure of claim 24, further comprising:
a removable portion that when removed creates the second through-hole.

* * * * *